July 4, 1967     M. E. MILLER     3,328,954
ELECTRONIC DIGITAL READOUT TIME INDICATING DEVICE
Filed April 22, 1965     2 Sheets—Sheet 1
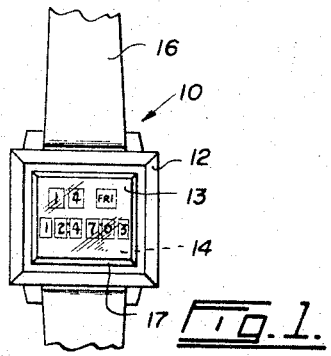
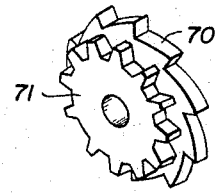
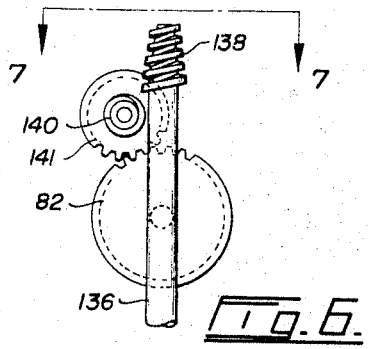
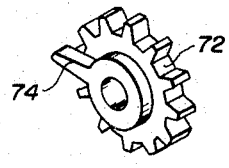
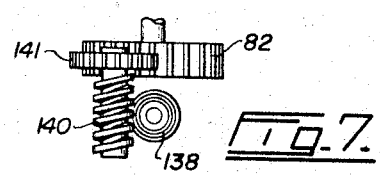
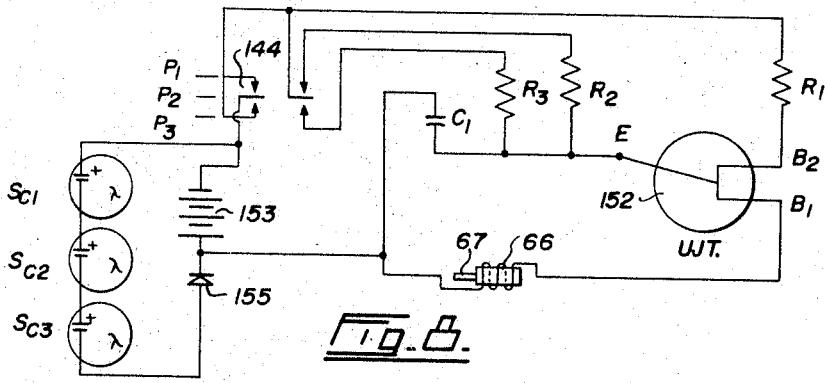
INVENTOR
MENDELL E. MILLER
BY
Fetherstonhaugh & Co.
ATTORNEYS July 4, 1967  M. E. MILLER  3,328,954
ELECTRONIC DIGITAL READOUT TIME INDICATING DEVICE
Filed April 22, 1965  2 Sheets-Sheet 2

INVENTOR
MENDELL E. MILLER
BY
Featherstonhaugh & Co.
ATTORNEYS

United States Patent Office 3,328,954
Patented July 4, 1967

3,328,954
ELECTRONIC DIGITAL READOUT TIME
INDICATING DEVICE
Mendell E. Miller, 4512 Woodgreen Drive, West
Vancouver, British Columbia, Canada
Filed Apr. 22, 1965, Ser. No. 450,112
2 Claims. (Cl. 58—23)

This invention relates to digital readout time indicating devices, and particularly to such devices that can be worn as wrist watches, although it may be in the form of a larger time indicating device.

An object of the present invention is the provision of a digital readout device for indicating the time in hours and minutes, and if desired, in seconds.

Another object is the provision of a digital readout device which not only indicates the time, but also the date and the day of the week.

A further object is the provision of a time indicating device utilizing multi-sided drums which are rotated circumferentially around their respective axes, the information to be indicated being on the sides of the drums.

A still further object is the provision of a digital readout time indicating device utilizing a unijunction transistor in a relaxation circuit to product pulses in increments of the lowest time interval to be indicated.

A still further object is the provision of an electrically operated time indicating device utilizing solar cells as a source of power or for recharging a battery in the electrical circuit.

A digital readout time indicating device according to the present invention comprises intermittently operated means adapted to indicate the time. An electrically operated pulse-responsive device is connected to said means intermittently to operate the latter in increments of the lowest time interval indicated by said means. A source of electrical power is in circuit with a unijunction transistor, said transistor being in circuit with the pulse-responsive device and adapted to direct current thereto in said increments of time. In a preferred form of the invention, one or more solar cells are provided as the source of power and/or in order to recharge suitable battery means.

Figure 2:
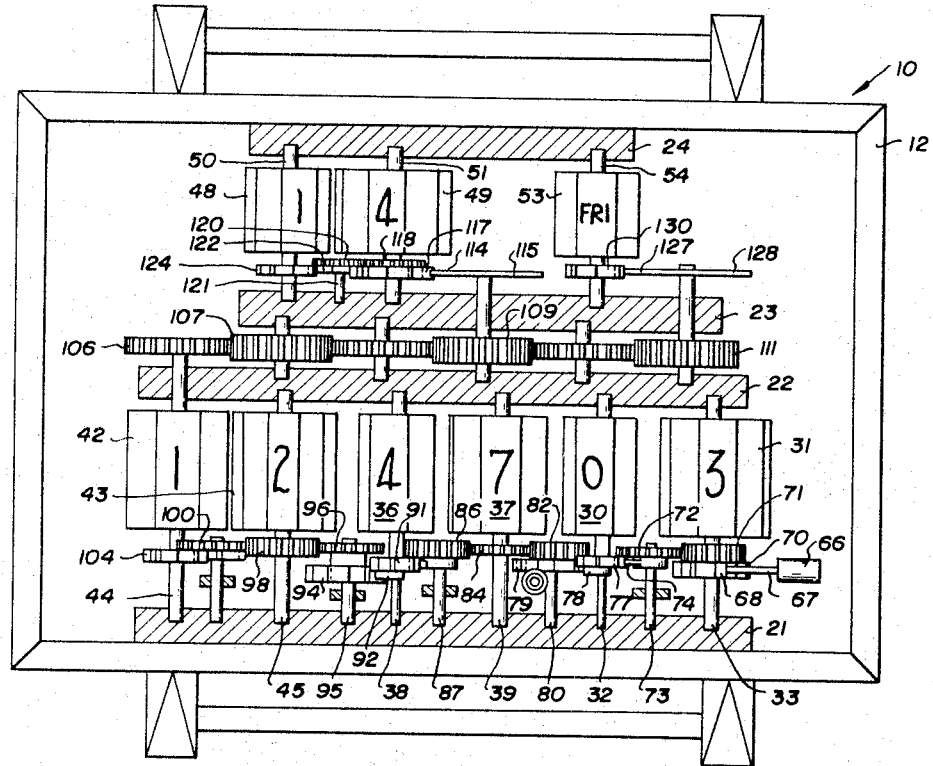
Figure 3:
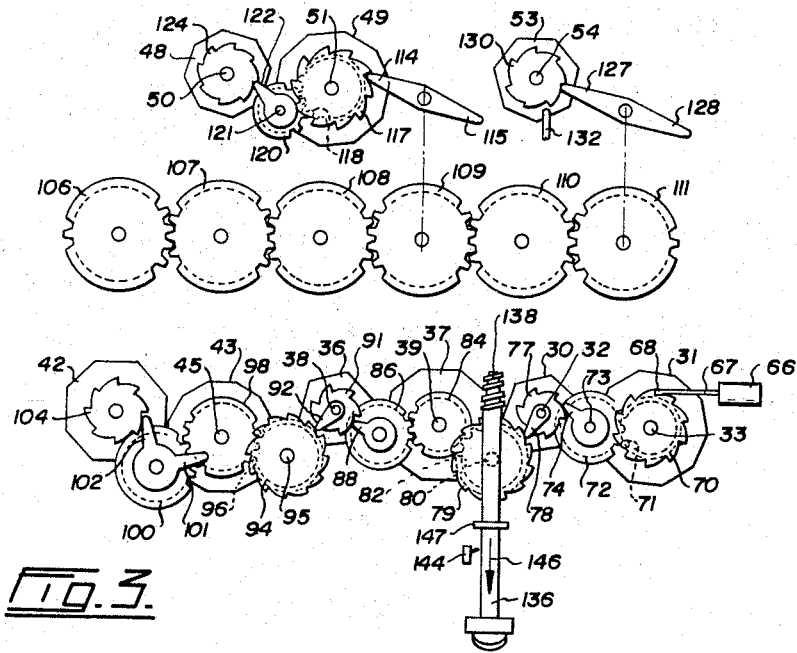

An example of this invention is illustrated in the accompanying drawings, in which, FIGURE 1 is a plan view of one form of time indicating device, FIGURE 2 is an enlarged plan view of the device with the face plate removed to show the interior thereof, FIGURE 3 is a diagrammatic flat lay-out of the drums and gears of the device, FIGURE 4 is a perspective view of a gear and ratchet used in the mechanism, FIGURE 5 is a perspective view of a gear and pawl used in the mechanism, FIGURE 6 is an enlarged diagrammatic plan view of the manual setting arrangement of the apparatus, FIGURE 7 is an end elevation of the arrangement shown in FIGURE 6, and FIGURE 8 is a wiring diagram of the electrical system of this device.

Referring to the drawings, 10 is one form of a digital readout indicating device according to the present invention. This device includes a casing 12 with a crystal 13 over a face plate 14. Casing 12 may have a strap or bracelet 16 connected thereto so that it can be worn on the wrist. A plurality of solar cells 17 surround face plate 14 and are exposed to the light.

This particular embodiment of the invention is adapted to indicate the time in hours, minutes and seconds, the date and the day of the week. Face plate 14 has a plurality of openings therein through which the indicated time, date and day can be seen. For example, the device illustrated in FIGURE 1 is indicating that the time is 12:47 and 3 seconds, the date of the month is the 14th, and the day, Friday.

FIGURES 2 and 3 illustrate the drum and gear arrangement for indicating the desired information. The drums and gears are fixedly mounted on shafts carried by supports 21, 22, 23 and 24 in casing 12.

Seconds drums 30 and 31 are six-sided and ten-sided, respectively, and are fixedly mounted on shafts 32 and 33. Drum 30 has numerals 0 to 5 on its sides, while drum 31 has numerals 0 to 9 on its sides.

Minutes drums 36 and 37 are six-sided and ten-sided respectively, and are fixedly mounted on shafts 38 and 39. The numerals 0 to 5 are on the sides of drum 36, and numerals 0 to 9 are on the sides of drum 37.

Hours drums 42 and 43 are eight-sided and twelve-sided respectively, and are fixedly mounted on shafts 44 and 45. Drum 43 has on its sides the series of numbers 0 to 1 four times. Drum 42 has on its sides in sequence the numbers 1 to 9, 0, 1 and 2.

Date drums 48 and 49 are eight-sided and ten-sided, respectively, and are fixedly mounted on shafts 50 and 51. Drum 48 has on its sides in sequence two series of numbers 0 to 3, while drum 49 has the numbers 0 to 9 on the sides thereof.

A day drum 53 has seven sides and is fixedly mounted on shaft 54, said sides having the days of the week thereon.

Intermittent rotation is imparted to the drum system in seconds by a solenoid 66 having a plunger 67 projecting therefrom with a pawl jewel 68 on its outer end. Plunger 67 is moved out and in again relative to solenoid 66 every second.

Pawl 68 of the solenoid plunger engages a ratchet 70 fixedly mounted on shaft 33 and having a gear 71 fixed thereto to rotate therewith, see FIGURE 4. This gear has a hundred teeth and meshed with an intermediate one hundred tooth gear 72 fixed on a shaft 73. Gear 72 has a pawl 74 thereon, see FIGURE 5, adapted once during each revolution to engage a ratchet 77 fixedly mounted on shaft 32 and having a pawl 78 radiating therefrom and adapted to engage a ratchet 79 fixedly mounted on a shaft 80 once every revolution. A gear 82 fixed on shaft 80 and having one hundred teeth meshes with another gear 84 also having one hundred teeth and fixedly mounted on shaft 39. Gear 84 meshes with an intermediate gear 86 having one hundred teeth fixedly mounted on a shaft 87. A pawl 88 radiating relative to gear 86 is adapted once every revolution to engage a ratchet 91 fixedly mounted on shaft 38, said ratchet having a pawl 92 adapted to engage a ratchet 94 fixedly mounted on a shaft 95 and to which is connected a gear 96 having 120 teeth which is in mesh with another gear 98 also having 100 teeth and fixedly mounted on shaft 45. Gear 98 meshes with an intermediate gear 100 having 120 teeth and two pawls 101 and 102 connected thereto which are arranged at 90° relative to each other. Pawls 101 and 102 are adapted progressively to engage a ratchet 104 fixedly mounted on shaft 44.

A transmission gear 106 is fixedly mounted on shaft 44, and is part of a gear train including intermeshing gears 107, 108, and 109, 110 and 111. Each of the gears 106 to 111 has 60 teeth. Gear 109 has pawls 114 and 115 arranged at 180° relative to each other and adapted to engage a ratchet 117 fixedly mounted on shaft 51. Ratchet 117 has a gear 118 connected thereto having 100 teeth and meshing with an intermediate gear 120 fixedly mounted on shaft 121 and having 100 teeth. A pawl 122 connected to gear 120 is adapted to engage a ratchet 124 fixedly mounted on shaft 50.

Gear 111 has pawls 127 and 128 connected thereto and arranged at 180° relative to each other, said pawls being adapted to engage a ratchet 130 fixedly mounted on shaft 54. A manually operated pawl 132 is also adapted to engage ratchet 130.

The pulsing of solenoid 66 causes drums 30 and 31 to indicate the time in seconds, drums 36 and 37 to indicate the time in minutes, and drums 42 and 43 to indicate the time in hours. At the same time, drums 48 and 49 indicate the date of the month, while drum 53 indicates the day of the week. Drum 53 can be set to indicate the correct day by means of manually-operated pawl 132.

Means is provided for setting the drums manually and by means of solenoid 66. For this purpose, a stem 136 is provided. This stem is mounted in casing 12 for axial movement and is frictionally held in any position to which it is moved. The stem has a tapered worm 138 on an inner end thereof which is normally free of but is adapted to be moved into engagement with a worm gear 140 to which a small gear 141 is connected, said gear 41 meshing with gear 82.

As stated above, stem 136 is normally in a position where worm 138 is out of mesh with worm gear 140. At this time, a three-position switch 144, located near stem 136, is in a position No. 1, at which time, solenoid 66 is pulsing normally. When it is desired to set the drums manually, stem 136 is pulled outwardly in the direction of arrow 146 in FIGURE 3 to shift worm 138 into mesh with worm gear 140. At this time a stop 147 on stem 136 moves the finger of switch 144 to a position No. 2, at which time solenoid does not operate. Rotation of stem 136 will set the drums to the desired positions. If it is desired to set the drums by power, stem 136 is drawn outwardly a little further, at which time, tapered worm 138 disengages from worm gear 140, and stop 147 moves the finger of switch 144 to a position No. 3, at which time solenoid 66 is operated many times faster than its normal speed in order that the drums can be rapidly set.

FIGURE 8 is a wiring diagram of the electrical circuit for operating solenoid 66, said circuit being controlled by switch 144.

When the switch 144 is put into position 1, the resistance voltage-divider action of the silicon bar of a unijunction transistor 152 produces a voltage between B1 and the negative side of the emitter junction of said transistor. At this same moment the emitter voltage is zero, being tied to the capacitor C1, hence the emitter junction is reverse-biased and no current flows through it. The voltage, from battery 153, which is a 1.3 volt mercury cell, and/or from solar cells Sc1, Sc2 and Sc3, across the capacitor C1, starts increasing as the current flows through the resistor R2. The cells are those indicated at 17 in FIGURE 1. Upon reaching its peak voltage, the emitter junction becomes forward-biased, and current starts to flow through it to B1, thus reducing the internal resistance and voltage drop. This action discharges the energy stored in the capacitor C1 into the B1 load, which is the miniature solenoid 66. The cycle then repeats with the capacitor recharging and discharging. The values of the circuit are chosen so that its resonant frequency is one cycle per second. Position 2 of switch 144 is in an off position and allows no current to flow from the battery to the circuit. Position 3 of switch 144 allows the current from the battery or the solar cells Sc1, Sc2 and Sc3 to flow through R3 which is approximately 75 times less resistance than R2. The result of putting switch 144 into position 3 is to multiply the frequency of oscillation by approximately 60 times. Thus solenoid 66 is intermittently operated much faster than usual so that the indicating drums can be quickly set to any desired position. The battery 153 is slowly charged by the three silicon solar cells Sc1, Sc2 and Sc3. The current from these cells flows through a diode 155 thereby preventing any reverse leakage from the battery in low light conditions. In periods of high illumination, the circuit will draw its total power requirements from the solar cells. It is preferable to use silicon solar cells, but others, such as cadmium sulphide or selenium cells, can be used.

The pulsing of solenoid by the relaxation circuit of FIGURE 8 rotates drums 30 and 31 in this example in increments of 1 second. After 60 seconds, drums 36 and 37 are rotated to indicate minutes, and after 60 minutes, drums 42 and 43 are rotated to indicate the hours. Seconds drums 30 and 31 are rotated at intervals of seconds, drums 36 and 37 at intervals of minutes, and drums 42 and 43 at intervals of hours. Drums 48 and 49 rotate at intervals of 24 hours to indicate the date, while drum 53 rotates at 24 hour intervals to indicate the day. Day drum 53 can be manually set by means of pawl 132, while the time and date drums can be manually or automatically set by means of stem 136.

What I claim as my invention is:

1. A digital readout indicating device, comprising digital readout means including a plurality of rotatably mounted time-indicia-bearing drums, gear train means interconnecting said drums, and solenoid operated pawl and ratchet means for driving said gear train and for rotating said drums in a given direction;

means for periodically energizing the solenoid at a first pulse rate to rotate the drums in increments of the lowest time interval indicated by the drums, comprising a direct-current voltage source (153), a unijunction transistor (152) having a pair of power circuit electrodes and a control electrode, first and second resistors (R1, R2), and switch means (144) having first and second positions connecting said solenoid in series with, successively, said voltage source, said first resistor and said power circuit electrodes, said switch means in said first position also connecting said second resistor at one end with said control electrode and at the other end with that end of the first resistor that is connected with said voltage source, and a capacitor connected at one end with said control electrode and at the other end with that end of the solenoid that is connected with the voltage source; and means for energizing said solenoid at a higher second pulse rate so that said drums are driven at a faster rate than normal by said solenoid operated means, comprising a third resistor (R3) having an appreciable higher resistance value than said second resistor, said third resistor being connected at one end with said control electrode, said switch means, when in the second position, being operable to disconnect said second resistor from said voltage source and to connect the third resistor at its other end with that end of said first resistor that is connected with said voltage source.

2. A digital readout indicating device, as defined in claim 1, wherein said switch means includes a further position for completely de-activating said solenoid means, said switch means in said further position being operable to disconnect all of said resistors from said source.

References Cited

UNITED STATES PATENTS

| | | | |
|---|---|---|---|
| 2,968,770 | 1/1961 | Sylvan | 331—111 |
| 2,995,690 | 8/1961 | Lemon | 318—138 |
| 3,001,114 | 9/1961 | Hermann et al. | 318—16 |
| 3,074,028 | 1/1963 | Mammano | 331—111 |
| 3,195,011 | 7/1965 | Polin | 315—84.6 |

FOREIGN PATENTS

| | | |
|---|---|---|
| 1,198,800 | 12/1959 | France. |
| 150,975 | 11/1931 | Switzerland. |
| 385,112 | 2/1965 | Switzerland. |

OTHER REFERENCES

Bistable Circuits Using Unijunction Transistors, pages 89–91, Dec. 19, 1958, issue of Electronics Magazine.

RICHARD B. WILKINSON, *Primary Examiner.*

G. F. BAKER, *Assistant Examiner.*